(12) United States Patent
Posti et al.

(10) Patent No.: US 6,430,173 B1
(45) Date of Patent: Aug. 6, 2002

(54) RECEPTION METHOD AND RECEIVER

(75) Inventors: Harri Posti; Kari Niemelä; Sakari Vikamaa, all of Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/355,049

(22) PCT Filed: Dec. 7, 1998

(86) PCT No.: PCT/FI98/00950

§ 371 (c)(1),
(2), (4) Date: Aug. 12, 1999

(87) PCT Pub. No.: WO99/30438

PCT Pub. Date: Jun. 17, 1999

(30) Foreign Application Priority Data

Dec. 8, 1997 (FI) .................................................. 974452

(51) Int. Cl.$^7$ .............................................. H04B 17/00
(52) U.S. Cl. .................... 370/347; 455/67.1; 455/226.1; 370/337
(58) Field of Search ................................ 370/319, 321, 370/336, 337, 345, 347, 348, 349, 252; 455/67.1, 226.1, 226.2, 245.1, 232.1, 234.1

(56) References Cited

U.S. PATENT DOCUMENTS

| | | | | |
|---|---|---|---|---|
| 5,301,364 A | * | 4/1994 | Arens et al. .................. | 455/69 |
| 5,335,369 A | * | 8/1994 | Aisaka ........................ | 455/116 |
| 5,452,332 A | * | 9/1995 | Otani et al. ................. | 375/345 |
| 5,524,287 A | * | 6/1996 | Yokoya et al. ............... | 455/126 |
| 5,548,594 A | * | 8/1996 | Nakamura .................. | 370/95.3 |
| 5,764,695 A | * | 6/1998 | Nagarai et al. ............. | 375/232 |
| 6,167,244 A | * | 12/2000 | Tomoe ...................... | 455/234.1 |
| 6,334,050 B1 | * | 12/2001 | Skarby ........................ | 455/126 |

FOREIGN PATENT DOCUMENTS

| | | |
|---|---|---|
| EP | 725479 | 8/1996 |
| GB | 2281157 | 8/1994 |
| WO | 96/01544 | 1/1996 |

* cited by examiner

*Primary Examiner*—Daniel Hunter
*Assistant Examiner*—Lana Le
(74) *Attorney, Agent, or Firm*—Altera Law Group, LLC

(57) ABSTRACT

The invention relates to a reception method and a receiver used in a TDMA radio system. The receiver receives signals placed in time slots allowing the receiver to establish connections. The receiver receives the signals, which are placed in time slots and vary in strength. The receiver comprises amplification means amplifying the received signals with an amplification coefficient of a particular size. The receiver is arranged to receive connection establishing signals from time slots and to form at least two sets of time slots from the time slots, and the amplification means amplify the signals in different sets of time slots with an amplification coefficient of a different size. The amplification means amplify the signals in the same set of time slots with an amplification coefficient of the same size. The receiver comprises measurement means for measuring the strength of the signal received by the receiver, and placing means for placing the connection establishing signal into the set of time slots based on the strength measurement performed for the received signal.

28 Claims, 3 Drawing Sheets

RECEPTION METHOD AND RECEIVER

FIELD OF THE INVENTION

The invention relates to a reception method using a TDMA multiple-access method, the reception method receiving connection establishing signals placed in time slots, and receiving the transmitted signals that vary in strength from the time slots and amplifying the received signals with an amplification coefficient of a particular size.

BACKGROUND OF THE INVENTION

In a radio system subscriber terminals, like mobile phones, are located at different distances from the base station. Path attenuation weakens a transmitted signal, in which case the power of the signals, transmitted with the same transmission power, vary as the signals arrive at the receiver. Various interference signals generated as a result of signal reflection can be summed as reversed in phase to an information signal, which then attenuates even more. The further apart the receiver and the transmitter are located from each other the more the various obstacles can attenuate the signal. If the signal attenuates enough, the connection between the subscriber terminal and the base station may be disconnected or the connection may not be established at all.

In radio systems connections are established using signals of different frequencies. The signals can also be transmitted by appropriately interleaving them into time slots. In prior art solutions frequency allocation during a call is performed in such a manner that the subscriber terminals located far from the base station are allocated to use a particular frequency. A signal propagated far over the radio path has typically needed a lot of strengthening in the receiver. Subscriber terminals located close to the base station are allocated to use some other frequency which has deviated from the signal frequency used by the subscriber terminal located far from the base station. If the signal distance from the transmitter to the receiver has been short, then the signal has typically been strengthened only slightly in the receiver.

Digital tuners are commonly used in the base station receivers of the radio systems. Typically a receiver comprises multiple tuners enabling the dynamic range of the receiver to be divided into smaller parts. Each tuner forms a specific part of the entire dynamic range of the receiver. In practice, the receivers have covered different frequency ranges, and the receivers have then together been able to receive signal on a predetermined frequency band. The dynamic range of the base station has thus been extensively increased.

In addition, the base stations use wideband multi-carrier radios allowing the size of the base stations to become smaller and lighter and the price to become more advantageous. The multi-carrier radios enable the different base station functions to be improved, and the operation of the base station thus becomes more flexible. If the powers of the signals the base station receives are variable, then automatic gain control (AGC) cannot be used in the receiver, since in practice the gain cannot be reduced only on the basis of a strong signal. As a result of the above, a weak signal cannot be received at all in said situation. Similarly on the basis of the weak signal, the gain cannot in practice be raised, since a strong signal would then gain too much and become distorted.

The lack of automatic gain control requires the receiver to have a very wide dynamic range. For example, in the GSM system the dynamic range of the base station receiver should be about 100 dB. Such a dynamic range cannot be implemented using current technology. Particularly the components performing the A/D conversion of the receiver restrict the increase of the dynamic range.

BRIEF DESCRIPTION OF THE INVENTION

It is an object of the present invention to provide a reception method and a receiver so as to solve the above problems. This is achieved with the type of reception method presented in the preamble, characterized by forming at least two sets of time slots composed of time slots using amplification coefficients of varying sizes, and amplifying signals received from the time slots of the same set of time slots with an amplification coefficient of the same size, and placing a connection establishing signal into the set of time slots so as to measure the strength of the received signal and to place the connection establishing signal into the set of time slots on the basis of the signal strength measurement performed for the received signal.

The invention also relates to a receiver used in a TDMA radio system receiving signals placed in time slots enabling the receiver to establish connections, the receiver receiving the signals, which are placed in the time slots and vary in strength, and comprising amplification means for amplifying the received signals with an amplification coefficient of a particular size.

The receiver is characterized by being arranged to receive connection establishing signals from time slots and to form at least two sets of time slots from the time slots, and the amplification means of the receiver amplifying the signals included in various sets of time slots with an amplification coefficient of a different size, and the amplification means amplifying the signals included in the same set of time slots with an amplification coefficient of the same size, and the receiver comprising measurement means for measuring the strength of the signal received by the receiver, and placing means for placing the connection establishing signal into a set of time slots based on the strength measurement performed for the received signal.

The preferred embodiments of the invention are disclosed in the dependent claims.

The invention is based on determining the time slot used on the connection between the transmitter and the receiver on the basis of the measurement performed for the signal received by the receiver.

The reception method and the receiver of the invention provide several advantages. The method enables the receivers to receive signals from frequency ranges that are identical, different or partly overlapping. Thus, the number of channels can be increased. In this method the time slots are grouped into sets of time slots. The time slot signals that belong to the same set of time slots are amplified in the amplification means with the same amplification coefficient. The number of amplification means can thus be minimized.

BRIEF DESCRIPTION OF THE DRAWINGS

In the following the invention will be described in greater detail in connection with the preferred embodiments with reference to the accompanying drawings, in which.

DETAILED DESCRIPTION OF THE INVENTION

Figure 1:
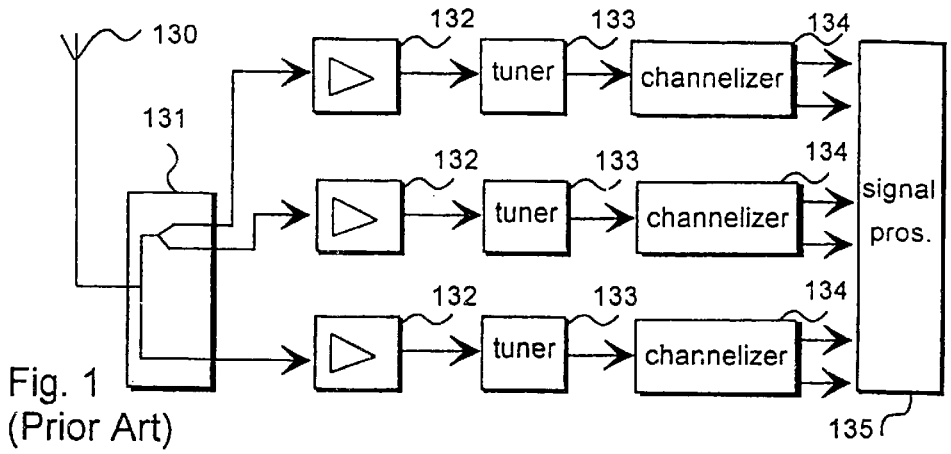
FIG. 1 shows a prior art receiver.

FIG. 1 shows a prior art receiver. The receiver comprises an antenna 130, signal division means 131 and amplification means 132. In addition, the receiver comprises tuning means 133, channelization means 134 and signal processing means 135. The receiver antenna 130 is connected, for example through a cable, to the division means 131. The receiver according to the Figure comprises several amplification means 132, each communicating with the specific tuning means 133. Furthermore, each tuning means 133 is also communicating through the specific channelization means 134 with the processing means 135. In practice, the receiver shown in the Figure comprises three separate receivers, each receiving signal from a specific frequency band.

The receiver receives a radio frequency signal by means of the antenna 130. The received signal is applied from the antenna to the division means 131 that branch the signal to each amplification means 132. The amplification means amplify the signal. Thereafter the amplified signal is directed to the tuning means. The tuning means 133 operate in wideband. From the tuning means 133 the signal is directed to the channelization means 134 that divide the wideband signal into several narrowband signals. The channelized signal is generally in digital mode, and is applied to the processing means 135 for coding.

Figure 2:
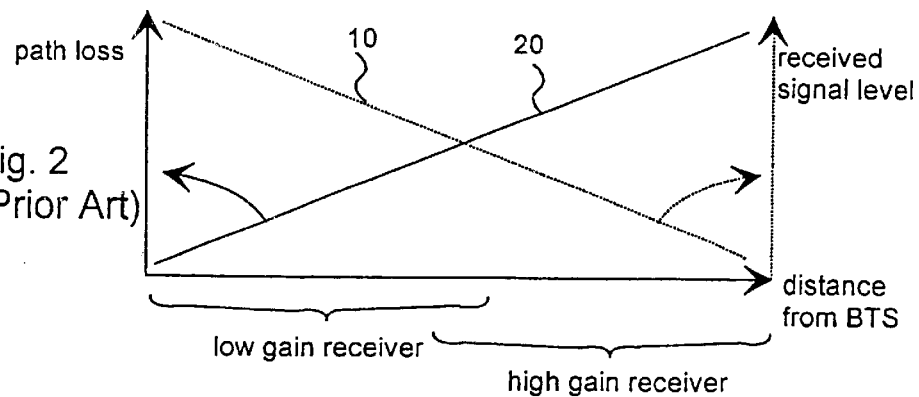
FIG. 2 shows the use of a prior art receiver.

FIG. 2 illustrates the use of the amplification means 132 of the prior art receiver. The Figure shows a curve 10 describing the change of the received signal level as a function of the distance between the receiver and the transmitter that transmitted the signal. A curve 20 describes the path attenuation change as a function of the distance between the receiver and the transmitter that transmitted the signal. The Figure shows that signals of varying powers arrive at the receiver. The further the signals arrive to the receiver the more the amplification means 132 of the receiver amplify the signals.

Let us assume that a prior art receiver establishes a connection to a transmitter. In practice, the transmitter is a subscriber terminal, for example a mobile phone. Connection establishment is started on the basis of random access bursts transmitted by the transmitter. When the receiver has received access bursts, the signal used on the connection is set at a particular frequency. The receiver selects the frequency used on the connection according to the received signal level. If the transmitter is placed relatively far from the receiver, the connection establishing signal is set at such a frequency that the signal propagates to such an amplification means 132 that amplifies the signal to a relatively high degree. If, in turn, the transmitter is placed relatively close to the receiver, the signal is set at such a frequency that as the signal arrives at the receiver the signal propagates to such an amplification means 132 that amplifies the signal to a relatively low degree.

Figure 3:
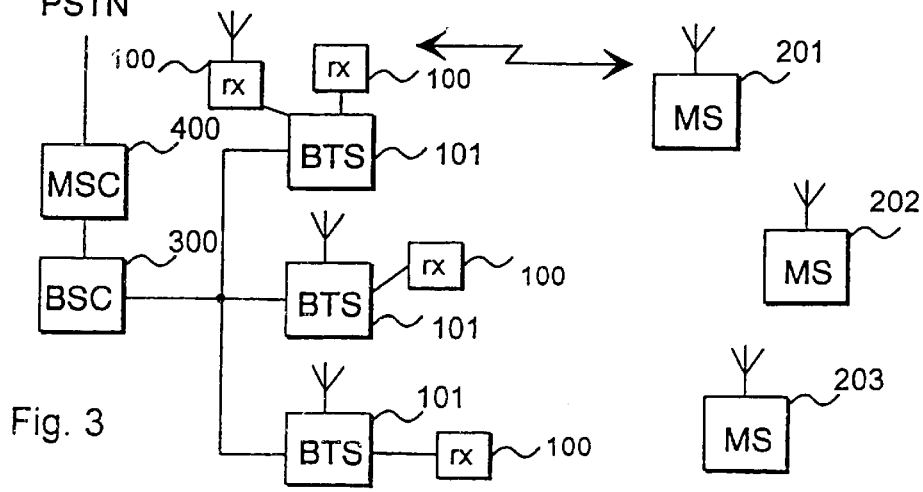
FIG. 3 shows a radio system using a reception method of the invention.

FIG. 3 shows a radio system employing the reception method of the invention. The radio system comprises a plurality of subscriber terminals 201, 202, 203 and base stations 101. In addition, the radio system typically comprises a base station controller 300 and a mobile switching centre 400 communicating with the PSTN network. The base station 101 according to the Figure typically comprises several receivers 100. The presented radio system is, for example, a GSM system using a TDMA multiple access method. In the TDMA multiple access method the signals are transmitted in time slots. The base stations 101 operate as receivers in the solution of the Figure. The subscriber terminals 201–203, in turn, operate as transmitters. The base station and the subscriber terminal establish a connection to one another by means of the transmitted signals.

Figure 4:
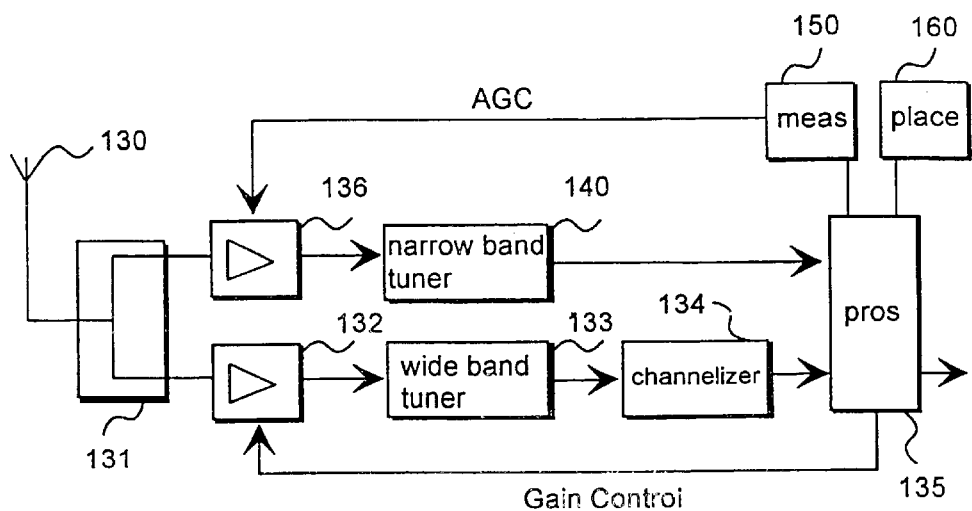
FIG. 4 shows a receiver of the invention.

FIG. 4 shows the receiver 100 of the invention. In practice, the receiver is placed in the base station 101. The receiver comprises an antenna 130, signal division means 131, amplification means 132, 136, tuning means 133, 140, channelization means 134 and signal processing means 135. The antenna 130 is connected to the signal division means 131 which is further connected to both amplification means 132, 136. The amplification means 132 is connected to the channelization means 134 through the tuning means 133. The amplification means 136 is, in turn, connected straight to the processing means 135 through the tuning means 140.

The receiver receives a radio frequency signal by means of the antenna 130. The received signal is applied from the antenna to the signal division means 131 that branch the signal to the amplification means 132, 136. The amplification means amplify the signal, and thereafter both amplified signals are directed to the specific tuning means 133, 140. The tuning means 133 operate in wideband, and the tuning means 140 in narrowband. From the tuning means 133 the signal is directed to the channelization means 134. The signal channelized by the channelization means is generally in digital mode. The channelized signal is further applied to the processing means 135 which, for example, code the received signals. The Figure also shows that gain control is used in the receiver. The processing means 135 form a gain control signal connected to the wideband amplification means 132.

In the solution according to the Figure the division means 131 divide the signal received by the antenna into two receiver branches. The first branch comprises at least one narrowband tuning means 140, whose dynamic range is large. The receiver is arranged to form an automatic gain control signal (AGC) which is applied to the narrowband amplification means 136, whose dynamic range is large due to the use of the automatic gain control signal.

The second receiver branch comprises at least one wideband tuning means 133 whose dynamic range is small. The narrowband tuning means 140 are needed in a GSM system receiver, since the random access burst activating connection establishment can be transmitted from any location of the base station 101 coverage area.

The random access burst is transmitted in a predetermined time slot and at a predetermined frequency. Typically the access burst is transmitted in time slot zero. The access burst level may vary a great deal according to situation. Connection establishment is possible, since owing to automatic gain control the dynamic range of the narrowband receiver branch is so large that the receiver is able to receive signals of varying powers, for example access bursts. Particularly the distance between the subscriber terminal functioning as the transmitter and the base station functioning as the receiver affects the size of the received signal level. In addition the reflections of the signals cause changes to the power level of the signal.

The receiver according to FIG. 4 further comprises measurement means 150 and placing means 160. In the receiver of the invention the measurement means 150 and the placing means 160 communicate with the processing means 135. The measurement means 150 also communicate with the amplification means 136. The measurement means 150 measure the strength of an activating signal used in connection establishment. The measurement means 150 also measure the strength of the connection establishing signal after connection establishment. The aim of the measurement is to determine the path attenuation size of the signal. In the solution of the invention the measurement means 150 measure the access burst transmitted by the transmitters 201–203. On the basis of the measurement performed by the measurement means 150 the amplification means 136 can pre-set an amplification coefficient for a signal to be received from a particular time slot establishing a connection between the transmitter and the receiver.

The placing means 160 place the connection establishing signal in a time slot on the basis of the strength measurement of the activating signal performed before establishing the actual connection. Based on the performed measurement the placing means 160 can place the connection establishing signals having a small signal strength in time slots, the signals therein being amplified by the amplification means 132 with a relatively high amplification coefficient. In addition, the placing means 160 can place the signals having a great signal strength in time slots, the signals therein being amplified by the amplification means 132 with a relatively low amplification coefficient. In practice, the above indicates that the amplification means 132 amplify signals, which substantially include path attenuations that are equal in size, with an amplification coefficient of the same size.

Figure 5:
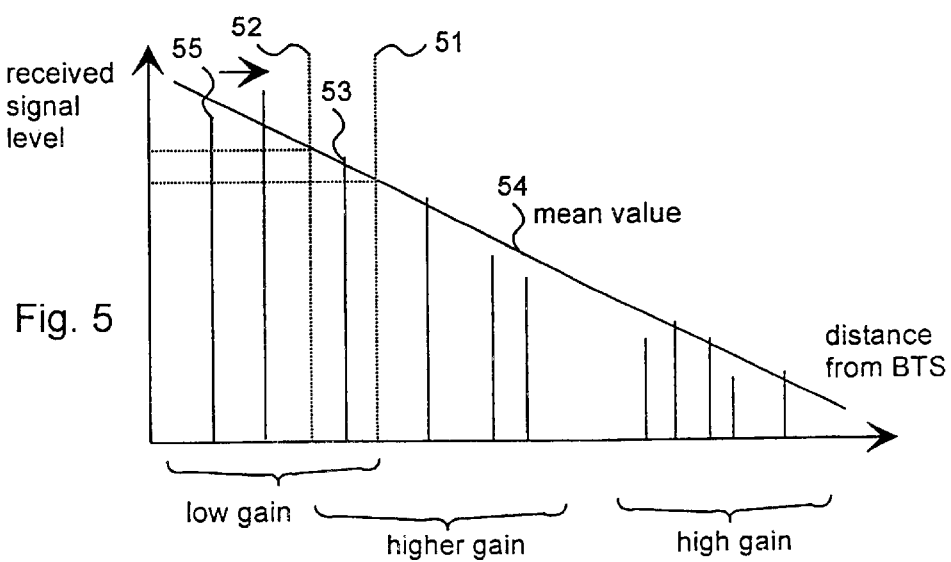
FIG. 5 shows different amplification ranges used in a receiver of the invention.

FIG. 5 illustrates the different amplification ranges used in the receiver of the invention. The Figure shows that the receiver has received signals that vary in strength. The strength differences of the signals are mainly caused by the different distances of the transmitter and the receiver. The Figure also shows a straight line 54 depicting the mean level of the received signals as a function of the distance between the transmitter and the receiver. The amplification range of the receiver of the invention is divided into three different areas forming sets of time slots. The placing means 160 form at least two sets of time slots from the time slots. Each set of time slots uses a specific amplification coefficient. The time slots are divided between the different amplification ranges in advance. The placing means 160 place the connection establishing signals into appropriate time slots on the basis of the measurement performed by the measurement means 150.

Forming sets of time slots enables the dynamic range of the receiver to be divided into at least two parts in such a manner that the parts slightly overlap. As the strength of the signal to be measured is on the overlapping part of the dynamic range the placing means 160 can place the signal into a time slot which is amplified to a relatively high degree or to a relatively low degree. Preferably the placing means 160 place the signal into the particular set of time slots having more available time slots. The measurement means 150 can dynamically change the size of the overlapping area, for example, based on the level distribution of the measured signal, traffic load, the statistics change of the received signal level or received signal quality.

The dynamic range is divided between three sets of time slots in such a manner that each set has a specific amplification coefficient. Threshold limits 51, 52 are indicted in the Figure between two sets of time slots. Let us assume that the receiver receives a signal transmitted by the subscriber terminal shown in step 55 of the Figure and that the signal is amplified with a low amplification coefficient. When the subscriber terminal recedes from the receiver, then at some point the received signal level exceeds the threshold limit 51 set.

When the signal exceeds the limit 51, then the time slot used by the signal is changed to another time slot, the signal therein being further amplified. When the subscriber terminal approaches the receiver, then the level of the signal received by the receiver has to exceed the limit 52 before the time slot used by the signal is changed again to the original set of time slots, where a lower amplification coefficient is used. If the receiver receives from the subscriber terminal the signal shown in step 53 in FIG. 5, then the signal transmitted by the subscriber terminal can be received by a receiver branch having a low or high amplification coefficient.

The threshold limits 51, 52 thus form the limits of a hysteresis range. When the signal has been placed in a time slot, then owing to the hysteresis the signal is not immediately placed into another time slot, even if the signal level varies slightly. In addition, timers preventing constant time slot change can be used in the receiver. When the time slot has been changed, then a new change is not performed until some time.

Figure 6:
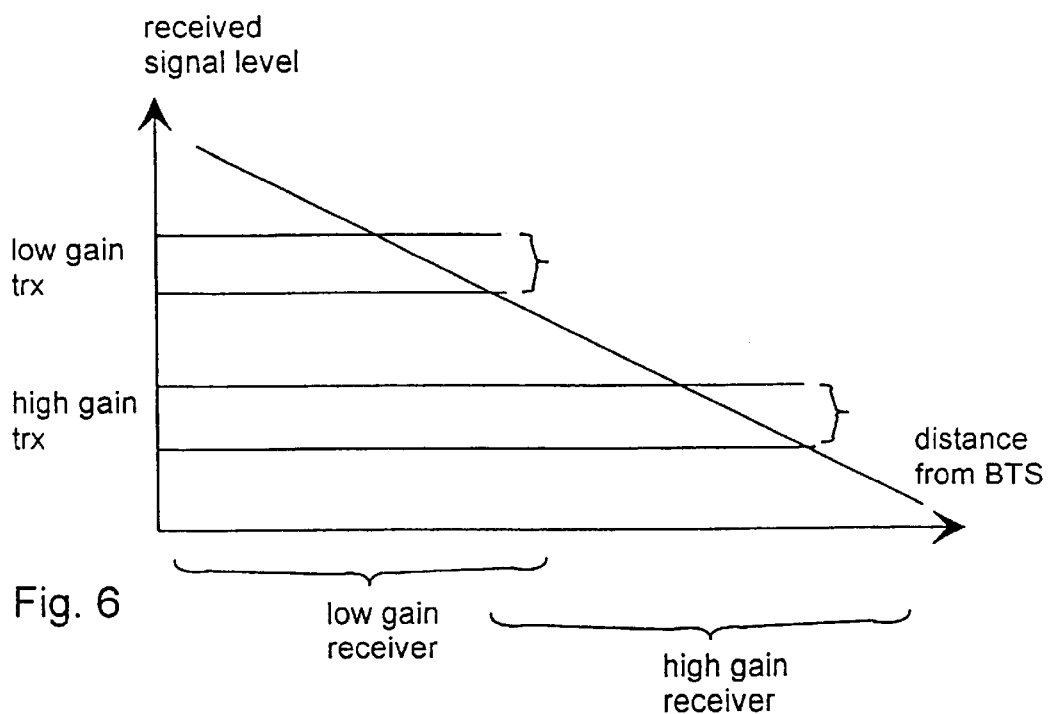
FIG. 6 shows a target window to be formed for a signal to be received.

FIG. 6 shows a target window formed for the received signal. Since the dynamic ranges of a low gain receiver and a high gain set of time slots are different, the low gain receiver is not capable of receiving weak signal. Therefore the power control target window has to be within the area where low gain is used. Typically a radio system aims to minimize the transmission power used by the transmitter so as to maintain the good quality of the connection establishing signal. When the transmission power of the transmitter is reduced, then the power of the signal received by the receiver is also reduced. The Figure shows that the high gain receiver is able to receive low power signals, in which case the target window can be placed at a relatively low signal level. However, the target window is set in such a manner that even the lower signal levels are sufficiently high in order to maintain good signal quality.

Cellular networks use various control channels transmitting different control data. As a control channel the GSM employs a BCCH channel transmitting BCCH signal. A narrowband receiver supports all time slots at the BCCH frequency. If the subscriber terminal is close to the base station, then the signal transmitted by the subscriber terminal probably does not really need to be amplified in the receiver. In such a situation a particular time slot, the signal therein being amplified by the amplification means 132 only slightly, should then be allocated to said subscriber terminal signal from the wideband receiver. However, let us assume that the low gain capacity of the receiver is already filled. Let us also assume that the signal transmitted by the subscriber terminal is not received in the area overlapping the dynamic ranges, in which case the signal cannot be placed into the time slots, whose signal is amplified to a high degree, either. In said situation the transmitter and the receiver establish a connection to each other on a traffic channel at the BCCH frequency.

Substantially the above situation is also created in a handover situation, where a signal that belongs to the low gain group should be transferred to a high-gain group. If all the channels of the high-gain group are reserved, then the traffic channel at the BCCH frequency is used on the connection after handover. If all the signals in the set of time slots are amplified in wideband, and if all the time slots in a wideband set of time slots are reserved, then the placing means places the signal to be measured at a frequency that is received by a narrowband receiver branch.

Figure 7:
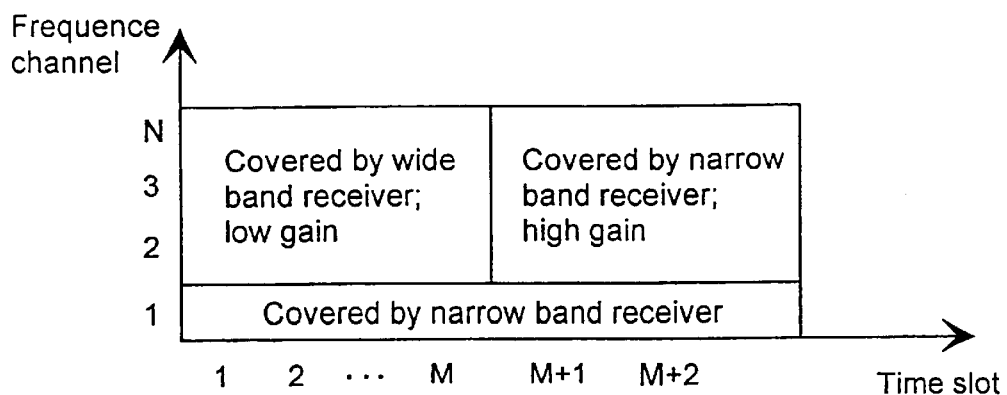
FIG. 7 shows the distribution of channels.

FIG. 7 shows the division of channels used in the receiver. The Figure shows that a wideband and a narrowband receiver receive time slots including signals of different frequencies. However, a wideband and a narrowband receiver receive signals from different time slots. But a narrowband receiver receives signals from each time slot. The signals received by a narrowband receiver are, however, of the same frequency.

Even though the invention has been described above with reference to the examples of the accompanying drawings, it is obvious that the invention is not restricted thereto but can be modified in various ways within the scope of the inventive idea disclosed in the attached claims.

What is claimed is:

1. A reception method using a TDMA multiple-access method, the reception method receiving signals establishing connections placed in time slots, and receiving the transmitted signals that vary in strength from the time slots and amplifying the received signals with an amplification coefficient of a particular size, characterized by forming at least two sets of time slots composed of time slots using amplification coefficients of varying sizes, and amplifying signals received from the time slots of the same set of time slots with an amplification coefficient of the same size, and placing a connection establishing signal into the set of time slots so as to measure the strength of the received signal, and to place the connection establishing signal into the set of time slots on the basis of the signal strength measurement performed for the received signal.

2. A method as claimed in claim 1, characterized by placing the signal into the set of time slots on the basis of signal strength or the like allowing to determine signal attenuation occurs when the signal propagates along the radio path to the receiver.

3. A method as claimed in claim 1, characterized by receiving the signal to be measured by a narrowband receiver.

4. A method as claimed in claim 1, characterized by measuring a random access burst starting connection establishment, and on the basis of the measured signal strength the connection establishing signal is placed into the set of time slots.

5. A method as claimed in claim 1, characterized by measuring the signal consisting of signalling data, and on the basis of the measured signal strength the connection establishing signal is placed into the set of time slots.

6. A method as claimed in claim 1, characterized by measuring the connection establishing signal after connection establishment, and on the basis of the measured signal strength the connection establishing signal is placed into the set of time slots.

7. A method as claimed in claim 1, characterized by placing the connection establishing signal into the set of time slots, the signal therein being amplified by a relatively high amplification coefficient, when the signal strength of the measured signal is small.

8. A method as claimed in claim 1, characterized by placing the connection establishing signal into the set of time slots, the signal therein being amplified by a relatively low amplification coefficient, when the strength of the received signal is great.

9. A method as claimed in claim 1, characterized by dividing a dynamic range of the receiver into at least two partly overlapping parts using the sets of time slots, and by placing the signal used on the connection into one of the two sets of time slots on the overlapping part, when the strength of the signal to be measured is on the overlapping part of the dynamic range.

10. A method as claimed in claim 1, characterized by dividing the dynamic range of the receiver into at least two partly overlapping parts using the sets of time slots, and placing the connection establishing signal into the set of time slots having more available time slots, when the strength of the signal to be measured is on the overlapping part of the dynamic range.

11. A method as claimed in claim 1, characterized by placing the signal to be measured at a frequency received by a narrowband receiver branch, if the signals in the set of time slots are amplified in wideband and if all time slots of said set of time slots are reserved.

12. A method as claimed in claim 1, characterized by dynamically changing the amplification of signals other than those of the remotest sets of time slots when forming at least three overlapping sets of time slots from the time slots.

13. A method as claimed in claim 1, characterized by dividing the dynamic range of the receiver into partly overlapping parts using the sets of time slots, and by forming at least two handover thresholds, the location of which can be dynamically changed, for each overlapping area.

14. A receiver used in a TDMA radio system receiving signals placed in time slots enabling the receiver to establish connections, the receiver receiving the signals, which are placed in the time slots and vary in strength, and comprising amplification means (132, 136) for amplifying the received signals with an amplification coefficient of a particular size, characterized by being arranged to receive connection establishing signals from time slots and to form at least two sets of time slots from the time slots, and the amplification means (132, 136) of the receiver amplifying signals included in various sets of time slots with an amplification coefficient of a different size, and the amplification means (132, 136) amplifying the signals included in the same set of time slots with an amplification coefficient of the same size, and the receiver comprising measurement means (150) for measuring the strength of the signal received by the receiver, and placing means (160) for placing the connection establishing signal into a set of time slots based on the strength measurement performed for the received signal.

15. A receiver as claimed in claim 14, characterized by the measurement means (150) measuring the strength of the signal received by the receiver or using similar measurements on the basis of which the placing means (160) place the signal into the set of time slots.

16. A receiver as claimed in claim 14, characterized by comprising narrowband tuning means (140) receiving from the amplification means (136) signal which is further applied to the measurement means (150) for measuring.

17. A receiver as claimed in claim 14, characterized by the measurement means (150) measuring a random access burst starting connection establishment, and based on the strength of the random access burst the actual connection establishing signal is placed into the set of time slots.

18. A receiver as claimed in claim 14, characterized by the measurement means (150) measuring the signal needed in connection establishment, the signal comprising signalling data and on the basis of the signal strength the actual connection establishing signal is placed into the set of time slots.

19. A receiver as claimed in claim 14, characterized by the measurement means (150) measuring the connection establishing signal after connection establishment, and on the basis of the signal strength the connection establishing signal is placed into the set of time slots.

20. A receiver as claimed in claim 14, characterized by the placing means (160) placing the connection establishing signal into the set of time slots, the signal therein being amplified by the amplification means with a relatively high amplification coefficient, when the signal strength of the signal measured by the measurement means (150) is small.

21. A receiver as claimed in claim 14, characterized by the placing means (160) placing the connection establishing signal into the set of time slots, the signal therein being amplified by the amplification means with a relatively low amplification coefficient, when the signal strength of the signal measured by the measurement means (150) is great.

22. A receiver as claimed in claim 14, characterized by dividing its dynamic range by sets of time slots into two partly overlapping parts, and by the placing means (160) placing the signal used on the connection into one of the two sets of time slots on the overlapping part, when the signal strength measured by the measurement means (150) is on the overlapping part of the dynamic range.

23. A receiver as claimed in claim 14, characterized by dividing its dynamic range by sets of time slots into at least two partly overlapping parts and by the placing means (160) placing the connection establishing signal preferably into the set of time slots comprising the largest number of available time slots, when the strength of the signal measured by the measurement means (150) is on the overlapping part of the dynamic range.

24. A receiver as claimed in claim 14, characterized by dividing its dynamic range into partly overlapping parts, and the overlapping area comprising at least two handover thresholds, the location of which the receiver can dynamically change.

25. A receiver as claimed in claim 14, characterized by the amplification means (132) being a wideband amplifier, the size of the amplification coefficient thereof being adjusted on the basis of measurement information obtained from the signal measurement of the measurement means (150).

26. A receiver as claimed in claim 14, characterized by the amplification means (136) being a narrowband amplifier forming a part of a narrowband branch of the receiver.

27. A receiver as claimed in claim 26, characterized by the amplification means (132) being wideband and forming a part of a wideband branch of the receiver, the placing means (160) placing the measured signal at a frequency received by a narrowband receiver branch, when all time slots of the set of time slots arriving through the wideband branch are reserved.

28. A receiver as claimed in claim 14, characterized by being arranged to dynamically change the amplification of signals other than those of the remotest sets of time slots, when the receiver forms at least three overlapping sets of time slots from the time slots.

\* \* \* \* \*